Patented Mar. 26, 1940

2,194,773

UNITED STATES PATENT OFFICE 2,194,773

FUR TREATING PREPARATION AND METHOD OF TREATING FURS

Milton A. Sirotta, Brooklyn, N. Y.

No Drawing. Application November 17, 1938,
Serial No. 241,017

9 Claims. (Cl. 149—28)

This invention relates to a preparation for treating furs and fur articles, for cleaning and other purposes and to the method of treating the furs and fur articles by the use of said preparation.

Heretofore in the treatment of furs and fur articles, there has been utilized sawdust impregnated with a cleansing liquid. This method is unsatisfactory because, owing to the low specific gravity of sawdust, it is difficult to remove all of the sawdust from the articles after the latter have been treated therewith. Furthermore, the sawdust absorbs more of the cleansing iquid than is necessary for performing the cleansing operation with the result that the excess liquid is wasted. Furthermore, the particles of sawdust have rough or ragged edges which frequently damage the fur.

It has also been proposed to use other substances such as comminuted corn cobs, corn oil-cake meal, granular cork, shredded leather, gypsum, etc., but all of these substances are unsatisfactory, principally because of their low specific gravity or excess absorptiveness, or because they are edible and attract rats or mice or vermin or because they are highly combustible, all of the substances hereinbefore named possessing one or more of the highly objectionable properties just mentioned.

One object of the present invention therefore is to provide a preparation which is free from the above mentioned and other disadvantages and objections and which is well adapted for treating furs and fur articles whereby to obtain optimum results. It is also an object of this invention to provide a preparation which can be produced and sold at a low price.

Other objects of the invention and the advantages of the preparation produced in accordance therewith and utilized for treating furs will in part be pointed out as the description proceeds and will in part be obvious from the present disclosure.

I have discovered that the ground shells of nuts, preferably coconut shells, (Cocos nucifera palmaceae) are highly advantageous and possess very valuable properties in connection with the treatment of furs, and fur skins for cleaning the hair of the fur for removing surplus dye therefrom, for glazing the furs, and generally for improving the appearance thereof. Coconut shells have a relatively high specific gravity (.67 as compared with the specific gravity of .17 of maple sawdust or the specific gravity of .33 of ground corn cob), and by reason of this relatively high specific gravity, ground coconut shells can be more easily removed from the furs and from the fur articles or from the pockets, or from between the fur and the linings of such articles. Another important advantage of ground coconut shells is that the cleansing liquid absorptiveness thereof is neither too low nor too high. Thus for example, while wood sawdust (maple chips) absorbs 100% of its weight of cleansing liquid and while the absorptiveness of other substances such as ground corn cobs and corn oil-cake meal is even higher than that of wood sawdust, ground coconut shells consisting of particles of the size hereinafter described as preferred in accordance with the present invention, absorbs an amount of cleansing liquid equal to about 45 to 55 per cent of its own weight. This percentage of absorptiveness in the case of ground coconut shells has been found to be economical and efficient, because the quantity of cleansing fluid is ample for the treatment of the furs and there is substantially no waste of cleansing liquid. Numerous other advantages are derived from the use of ground coconut shells for treating furs in accordance with the present invention. Among such additional advantages are the following:

The ground coconut shells are non-edible and therefore will not attract vermin; they are not subject to spontaneous combustion; they are odorless; they do not ferment; they do not chemically react with the fur (as may be the case with such substances as gypsum); they are less bulky than most of the preparations heretofore used, as they have a high specific gravity; they can be used longer than other substances such as corn oil-cake meal or ground corn cobs; they have a proper mild abrasive action on the furs; and, coconut shells being plentiful, the preparation of the present invention can be produced quickly and at low cost.

The ground coconut shells utilized in the preparation of the present invention consist of shell particles of sizes which may vary considerably depending upon the nature of the furs to be treated. In general, the particles of sizes in the range of 14 to 40 mesh, standard sieves, are satisfactory, although as indicated, smaller or larger particles may be used. For some purposes, the ground coconut shells may have the consistency of powdered particles. The particles of the sizes indicated are preferably free of sharp edges and are generally round.

For producing the ground coconut shells, the preferred method is to utilize a grinder of the type having a rotary cutter, although a hammer mill grinder may be utilized. The preferred method of producing the ground coconut shells is in general as follows:

The coconut shells with the husk removed and the milk and meat extracted are broken into small sizes for feeding into the rotary cutter. Preferably the rotary cutter is provided with a blower and dust collector, the fibers of the coconut shells being removed from the shell particles. Finally the ground coconut shells are sifted to separate the tailings from the particles of the desired size. Ordinarily, the particles of the ground coconut shells thus produced have surfaces which are free from harmful sharp edges, but all danger of rough and sharp edges on the surfaces of the particles of the ground shells can be removed by tumbling the ground shells in a tumbler mill. The ground coconut shell preparation thus produced may then be used for treating the furs as hereinbefore explained, usually by tumbling the furs and fur articles in a container having therein a suitable quantity of the ground coconut shells to which there has been added a proper quantity of cleansing liquid. Any suitable cleansing liquid may be used, such as petroleum, naptha, benzol, coal tar naptha, benzene, xylene, etc., or mixtures of any of the above with any of the non-inflammable cleansing liquids or solvents such as the chlorinated hydrocarbons, carbon tetrachloride, chloroform, chlorinated ethylenes, etc., also the water soluble cleansing substances or solvents may be utilized as well as acetone, the alcohols, etc., besides those cleansing liquids and solvents mentioned above, and others.

While as indicated above a preparation comprising ground coconut shells is preferred, the ground shells of other nuts may also be used and in general are much to be preferred to the use of sawdust, ground corn cob, corn oil-cake meal, gypsum, etc., for all of the ground shells of the nuts mentioned and similar ground nut shells are free from the objections hereinbefore mentioned in reference to sawdust, ground corn cobs, corn oil-cake meal, etc. Among the other shells which are suitable are the shells of black walnuts, butternuts, English walnuts, and Brazil nuts. It will be understood also that the ground coconut shells may be mixed with ground shells of other nuts or a mixture of the ground shells of the other nuts without coconut shells may be used.

Thus it is seen that the fur treating preparation and the method of treating furs, of the present invention, are well adapted to accomplish the several objects thereof and it is apparent that the use of the ground coconut shells have numerous important advantages and very desirable properties which are made use of for accomplishing the purposes of the present invention. It will be understood, however, that while I have disclosed the preferred form of the invention as well as other forms of the invention adapted to accomplish the objects thereof, and that while I have indicated the preferred manner of practicing the method of the present invention, the characteristics of the fur treating preparations and in the method of utilizing said preparations may be varied to some extent without substantially detracting from the advantages in the use of said preparations and without departing from the spirit of the present invention. It will be understood, also, that the preparation of the present invention may be used for treating other materials and articles, besides furs and fur articles, for example, for cleaning pile fabrics, rugs, etc., and it is within the scope of the present invention as defined by the claims to utilize the ground nut shell preparation for the treatment of materials and articles other than those specifically mentioned in the claims. I do not wish to be limited precisely to the invention as herein shown or described, except as may be required by the appended claims.

It will be observed that in the production of my preparation it has been found unnecessary to utilize heat. It is also to be noted that my preparation is odorless and dustless. A decided advantage accrues to the user of my preparation from the fact that the cleaning or similar operations in which my preparation is used are accomplished exceedingly rapidly. This is due in a large measure to the fact that my preparation consists of relatively hard particles which act favorably and rapidly upon the articles upon which they are used. After my preparation has been used, it can readily be removed from the articles upon which it has been used by shaking the same therefrom, and this is accomplished very rapidly by reason of the nature and character of the particles which I employ in my preparation.

Having thus described my invention, what I claim and desire to secure by Letters Patent is:

1. A preparation for the treatment of furs or similar articles comprising ground nut shells.
2. A preparation for the treatment of furs or similar articles comprising ground coconut shells.
3. A preparation for the treatment of furs or similar articles comprising the ground shells of the nuts of the group consisting of coconuts, walnuts, butter nuts, and Brazil nuts.
4. The method of treating furs or similar articles which comprises bringing said articles into contact with a mass of ground nut shells impregnated with a cleansing liquid.
5. The method of treating furs or similar articles which comprises bringing said articles into contact with a mass of ground coconut shells impregnated with a cleansing liquid.
6. The method of treating furs or similar articles which comprises bringing said articles into contact with a mass of ground shells of nuts of the group consisting of coconuts, walnuts, butter nuts, and Brazil nuts impregnated with a cleansing liquid.
7. The method of treating furs or similar articles which comprises bringing said articles into contact with a mass of ground nut shells.
8. The method of treating furs or similar articles which comprises bringing said articles into contact with a mass of ground coconut shells.
9. The method of treating furs or similar articles which comprises bringing said articles into contact with a mass of ground shells of nuts of the group consisting of coconuts, walnuts, butter nuts, and Brazil nuts.

MILTON A. SIROTTA.